Patented Nov. 6, 1934

1,979,645

UNITED STATES PATENT OFFICE 1,979,645

COATING PREPARATIONS

Hermann Schladebach, Dessau in Anhalt, and Herbert Hähle, Dessau-Ziebigk in Anhalt, Germany, assignors to I. G. Farbenindustrie Aktiengesellschaft, Frankfort-on-the-Main, Germany No Drawing. Application June 28, 1930, Serial No. 464,704. In Germany May 5, 1928

14 Claims. (Cl. 134—79)

This invention relates to the manufacture of coating preparations comprising cellulose derivatives by dissolving a cellulose ester of an acid of high molecular weight (such as a fat acid, a naphthenic acid or a resin acid) in linseed oil, linseed oil varnish, wood oil or another drying oil. A preparation so obtained, when applied as a coating to a porous base, such as wood, yields on drying a lustrous film, whereas linseed oil, for example, otherwise merely penetrates into the wood. By means of the coating preparations obtainable by this invention, it is thus possible to coat a porous surface by the application of a single coating in such a manner that the pores are completely closed.

There may be incorporated in the preparations thus obtainable one or more diluents, soluble or insoluble coloring matters or the like. There may also be introduced into the preparations substances which are adapted to undergo reaction with one or more constituents of the preparations for the purpose of modifying the properties of the final products. Such additions are, for example, siccative materials (metal salts of higher fatty acids), such as resinate or oleate of cobalt or manganese, compounds such as benzyl chloride which, it may be in presence of a catalyst (for example ferric chloride), influence the properties of the final products by reaction with main constituents of the preparation or promote hardening by undergoing auto-condensation.

If there is incorporated in the solution a relatively high proportion of a pigment, compositions may be obtained which can be diluted by means of a suitable solvent or diluent to form a coating preparation. Thus, by grinding a sufficient proportion of a pigment with a solution of the cellulose ester in a drying oil (conveniently of about 5–10 per cent strength) in a suitable machine, there may be obtained stable pastes in which the pigment is homogeneously dispersed, even in the case of heavy pigments, such as red lead, which, when dispersed in a liquid medium, generally tend to settle, or form a deposit which can be dispersed throughout the liquid by stirring only with difficulty or not at all. The pastes may be made up for use by the addition of a small proportion of linseed oil, wood oil, turpentine oil, benzene, tetrahydronaphthalene or the like, and when applied to an iron surface, yield on drying a protective coating which, by reason of the homogeneous dispersion of the pigment and the high resistance towards water conferred on the coating by the content of cellulose derivatives impervious to water, is superior to a coating produced, for example, by the usual red-lead varnish paints.

Generally, only a small proportion of the cellulose ester is required for producing a valuable coating agent rich in oil, in the form of a stable paste; this is in contrast to the known methods of producing stable pastes from red lead by grinding it with a colloidal suspension of an aluminium salt of a resin acid or a fatty acid in swollen condition in benzine, together with linseed oil or varnish, and if required with the addition of infusorial earth, for in order to produce by this method a uniform mixture of the pigment with the varnish, a relatively large proportion of the aluminium salt and of the swelling agent is required.

The term "acid of high molecular weight" as herein used is intended to refer to acids containing at least seven carbon atoms.

The following examples illustrate the invention, the parts being by weight:—

*Example 1.*—1–5 parts of cellulose trilaurate are dissolved at about 140° C. in 100 parts of linseed oil varnish or wood oil. The varnish so obtained may be applied to a porous surface and, on drying, leaves a lustrous coating on the surface.

In the varnish prepared in accordance with this example from 5 parts of cellulose trilaurate and 100 parts of linseed oil varnish there may be dissolved 10 parts of a cobalt-manganese-siccative; owing to reaction between the linseed oil, the metal compound and atmospheric oxygen, the drying of the coatings produced with the varnish is accelerated and the hardness of the dried coating is improved.

*Example 2.*—5 parts of cellulose trilaurate are dissolved in 100 parts of linseed oil varnish at about 130° C. whilst stirring. The solution is cooled to about 50° C. and stirred with the addition of 3 parts of siccative varnish. The viscous solution thus produced is triturated with 600 parts of red lead. The product is a homogeneous stable paste which may be diluted as desired to form a paint by the addition of a small quantity of linseed oil, wood oil, or tetrahydronaphthalene.

*Example 3.*—4 parts of cellulose naphthenate are dissolved in 80 parts of linseed oil varnish. To the solution cooled to room temperature are added 20 parts of blown wood oil and 2 parts of siccative varnish. The viscous mass obtained is triturated in a suitable mill with 100 parts of red iron oxide. The paste obtained may be diluted for use as a paint in the manner described in Example 2.

*Example 4.*—2.5 parts of cellulose trilaurate are dissolved in 50 parts of linseed oil varnish. At a temperature of about 70° C. 48 parts of blown linseed oil, 2 parts of turpentine and 3 parts of siccative varnish are added. The oleic mass thus obtained is triturated with 200 parts of white lead and 3 parts of lamp black.

In the examples given above, we described mainly the manufacture of coating preparations containing as an essential constituent a cellulose laurate. However, our invention is not limited to the use of this cellulose ester. In an analogous manner preparations are obtainable when starting from a cellulose ester containing in its molecule the radicle of a saturated or unsaturated organic acid containing at least seven carbon atoms. Without limiting our invention we enumerate the following cellulose derivatives:—cellulose palmitate, cellulose stearate, cellulose oleate, cellulose ricinoleate, cellulose naphthenate, cellulose resinate, or mixed esters such as cellulose laurate stearate, cellulose laurate acetate, cellulose stearate naphthenate, and so on.

This application is a continuation-in-part of our co-pending application Serial No. 359,718, filed May 1, 1929.

What we claim is:—

1. An oil varnish containing cellulose laurate dissolved in a major proportion of a drying oil.
2. An oil varnish containing cellulose laurate dissolved in a major proportion of a drying oil, and a coloring matter.
3. An oil varnish containing cellulose laurate dissolved in a major proportion of a drying oil, and a siccative material.
4. An oil varnish containing cellulose laurate dissolved in a major proportion of linseed oil varnish.
5. An oil varnish containing cellulose laurate dissolved in a major proportion of linseed oil varnish, and a coloring matter.
6. An oil varnish containing cellulose laurate dissolved in a major proportion of linseed oil varnish, and a siccative material.
7. A preparation in a pasty form containing cellulose laurate dissolved in a major proportion of a drying oil, and a pigment, said preparation being dilutable with a varnish constituent.
8. A preparation in a pasty form containing about 5 parts of cellulose laurate, dissolved in about 100 parts of linseed oil varnish mixed with about 3 parts of a siccative varnish and with about 600 parts of an inorganic pigment.
9. An oil varnish containing a cellulose ester of an organic acid of the group consisting of saturated aliphatic acids with more than seven carbon atoms and naphthenic acid, dissolved in a major proportion of a drying oil.
10. An oil varnish containing a cellulose ester of an organic acid of the group consisting of saturated aliphatic acids with more than seven carbon atoms and naphthenic acid, dissolved in a major proportion of a drying oil, and a coloring matter.
11. An oil varnish containing a cellulose ester of an organic acid of the group consisting of saturated aliphatic acids with more than seven carbon atoms and naphthenic acid, dissolved in a major proportion of a drying oil, and a siccative material.
12. A preparation in a pasty form containing a cellulose ester of an organic acid of the group consisting of saturated aliphatic acids with more than seven carbon atoms and naphthenic acid, dissolved in a major proportion of a drying oil, and a pigment, said preparation being dilutable with a varnish constituent.
13. A preparation in a pasty form containing about 5 parts of a cellulose ester of an organic acid of the group consisting of saturated aliphatic acids with more than seven carbon atoms and naphthenic acid, dissolved in about 100 parts of a drying oil mixed with about 3 parts of a siccative varnish and with about 600 parts of an inorganic pigment.
14. An oil varnish comprising cellulose trilaurate dissolved in a major proportion of linseed oil varnish.

HERMANN SCHLADEBACH.
HERBERT HÄHLE.